United States Patent
Kitaji

(10) Patent No.: US 7,454,227 B2
(45) Date of Patent: Nov. 18, 2008

(54) WIRELESS COMMUNICATION MODULE, COMMUNICATION TERMINAL, AND IMPEDANCE MATCHING METHOD

(75) Inventor: Mitsuhiro Kitaji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 575 days.

(21) Appl. No.: 11/263,073

(22) Filed: Oct. 31, 2005

(65) Prior Publication Data

US 2006/0094458 A1    May 4, 2006

(30) Foreign Application Priority Data

Nov. 1, 2004    (JP) .............................. 2004-318019

(51) Int. Cl.
*H04B 7/00* (2006.01)
(52) U.S. Cl. ...................... 455/522; 343/860; 343/822; 455/82; 455/69
(58) Field of Classification Search .................. 455/522
See application file for complete search history.

(56) References Cited

U.S. PATENT DOCUMENTS

| | | | | |
|---|---|---|---|---|
| 5,673,001 | A * | 9/1997 | Kim et al. ..................... | 330/284 |
| 5,880,635 | A * | 3/1999 | Satoh .......................... | 330/144 |
| 6,020,787 | A * | 2/2000 | Kim et al. ..................... | 330/279 |
| 6,806,836 | B2 | 10/2004 | Ogawa et al. | |
| 6,885,353 | B2 * | 4/2005 | Kurihara ....................... | 343/860 |
| 6,920,312 | B1 * | 7/2005 | Benjamin ...................... | 455/69 |
| 6,961,368 | B2 * | 11/2005 | Dent et al. .................... | 375/219 |
| 6,993,297 | B2 * | 1/2006 | Smith, Jr. ...................... | 455/82 |
| 2002/0024406 | A1 * | 2/2002 | Matsumoto et al. ......... | 333/164 |
| 2002/0085509 | A1 * | 7/2002 | Funayama et al. .......... | 370/276 |
| 2003/0071721 | A1 * | 4/2003 | Manis et al. ............ | 340/310.03 |
| 2003/0199256 | A1 * | 10/2003 | Klomsdorf et al. .......... | 455/121 |
| 2004/0008151 | A1 * | 1/2004 | Kurihara ....................... | 343/860 |
| 2004/0198271 | A1 * | 10/2004 | Kang ........................ | 455/127.1 |
| 2005/0059362 | A1 * | 3/2005 | Kalajo et al. ............. | 455/127.1 |
| 2005/0146387 | A1 * | 7/2005 | Toda et al. ................... | 331/175 |

FOREIGN PATENT DOCUMENTS

| | | |
|---|---|---|
| EP | 1 093 222 | 4/2001 |
| JP | 2003-174367 | 6/2003 |
| KR | 2001-0043939 | 5/2001 |
| KR | 2003-0069846 | 8/2003 |

* cited by examiner

*Primary Examiner*—Matthew Anderson
*Assistant Examiner*—Hai V Nguyen
(74) *Attorney, Agent, or Firm*—Hogan & Hartson LLP

(57) ABSTRACT

A wireless communication module for engaging in communications with a base station, the wireless communication module being incorporated into an information device having an antenna, includes a transmitter, a transmission power being controlled by the base station; variable impedance matching section arranged between an antenna connector connected to the antenna and the transmitter, which adjusts an impedance by changing a matching parameter for the variable impedance matching section; transmission power detector for detecting the transmission power; and a controller for adjusting the matching parameter based on the detected transmission power of the transmitter detected by the transmission power detector.

8 Claims, 6 Drawing Sheets

WIRELESS COMMUNICATION MODULE, COMMUNICATION TERMINAL, AND IMPEDANCE MATCHING METHOD

BACKGROUND OF THE INVENTION

1. Field of the Invention

The present invention relates to a wireless communication module, a communication terminal, and an impedance matching method. More specifically, the present invention relates to technology of matching impedance with an antenna in a wireless communication module incorporated into an information device (for example, a PDA).

Priority is claimed on Japanese Patent Application No. 2004-318019, filed Nov. 1, 2004, the content of which is incorporated herein by reference.

2. Description of the Related Art

In a communication terminal such as a portable mobile phone in which an antenna is equipped, in gene, circuits are designed so as to match an antenna with an RF circuit (radio amplifying circuit) in a range of the frequencies used. In wireless communication modules, a matching circuit is typically designed so as to be incorporated into an information device. Since there may be a mismatch due to the influence of objects placed around the antenna in these communication terminals and wireless communication modules, matching circuit technology having an automatic matching capability has been proposed.

According to conventional techniques, for example, in a portable wireless communication device provided with an electric power detecting device, a device for detecting a phase of a reflected signal from the antenna, and a matching circuit for adjusting a variable impedance to match between the antenna and an RF circuit, reflection phase from the antenna and input electric power into the antenna are compared with a reference value, thereby obtaining an optimal matching. The portable wireless communication device measures a reflection phase $S_P$ from the antenna and a consumption current $S_1$ supplied to the antenna using a phase detector and an ammeter to compare them with $S_{P0}$ and $S_{10}$ measured in advance in a matched state, thereby attaining matching by adjusting the matching circuit repeatedly when these values deviate from the pre-measured values (refer to Japanese Unexamined Patent Application, First Publication No. 2003-174367).

Furthermore, some antenna circuits have a plurality of matching circuits, by which the transmission level is detected in front of the antenna to switch the matching circuits so that the transmission level can be maximized. These antenna circuits are designed to select a matching circuit so as to maximize the transmission level at a level-detecting portion installed closest to the matching circuits.

Furthermore, some impedance matching devices are provided with a variable impedance matching portion installed between a transmitting portion and an antenna, a standing wave ratio detecting portion, a voltage phase detecting portion, an impedance calculating portion and the like to detect the voltage standing wave ratio (VSWR) of transmission waves, thereby obtaining matching. Such impedance matching devices measure an impedance of the antenna with respect to a transmission channel and calculate a difference between the thus-measured impedance and an impedance $Z_0$ at the transmitting portion to be matched, thereby attaining matching and also obtaining matching parameters in this instance.

In the above-described conventional technique, impedance matching requires an addition of a phase detecting circuit, a voltage standing wave ratio (VSWR) detecting circuit and the like to the circuit, resulting in problems such as increased size of the communication terminal and the like.

There is another problem in that in a wireless communication module for engaging in communications so as to be incorporated into an information device, impedance is set in advance to a predetermined value (for example, 50Ω) and the impedance deviates from the predetermined value due to electromagnetic influence from the incorporated information device, thereby making it impossible to carry out accurate impedance matching.

SUMMARY OF THE INVENTION

The present invention has been made for solving these problems and provides a wireless communication module, a communication terminal, and an impedance matching method which are able to easily attain impedance matching with an antenna, when a circuit is configured at the smallest possible size and the wireless communication module is incorporated into the information device (for example, a PDA) and the like, in the wireless communication module incorporated into an information device.

The present invention has been made for solving the above problems, and a first aspect of the present invention is a wireless communication module for engaging in communications with a base station, the wireless communication module being incorporated into an information device having an antenna, including a transmitter, a transmission power being controlled by the base station; variable impedance matching section arranged between an antenna connector connected to the antenna and the transmitter, which adjusts an impedance by changing a matching parameter for the variable impedance matching section; transmission power detector for detecting the transmission power; and a controller for adjusting the matching parameter based on the detected transmission power of the transmitter detected by to transmission power detector.

With this, impedance matching with the antenna can be easily attained when the wireless communication module incorporated into the information device and the like. Furthermore, in this instance, electric power supplied to the antenna is minimized, achieving power conservation. It is not necessary to design the wireless communication module tailored to the information device as in the conventional technique. In addition, by only detecting the transmission power of the transmitter, it is possible to attain impedance matching, thereby making it possible to achieve a minimal circuit construction without addition of special circuits.

Additionally, according to a second aspect of the present invention, the controller may adjust the matching parameter when the transmission power of the transmitter detected by the transmission power detector is stable.

With this, it is possible to ensure that matching parameters with which impedance matching with the antenna can be are obtained.

Furthermore, according to a third aspect of the present invention, the wireless communication module may further include an environment detector for detecting a predetermined external environment condition; and a storage portion for storing the matching parameter, and the controller may associate the matching parameter that has been used for the adjustment of the impedance with information on the environment detected by the environment detector and store the matching parameter and the information into the storage portion.

Therefore, it is possible to immediately attain impedance matching with the antenna by reading out matching parameters from the storage portion, according to the external environment conditions.

Furthermore, according to a fourth aspect of the present invention, the wireless communication may further include a storage portion for storing the matching parameter, and the controller may obtain device-identifying information from the information device and associates the matching parameter that has been used for the adjustment of the impedance with the device-identifying information and store the matching parameter and the device-identifying information in the storage portion.

With this, it is not necessary to design a wireless communication module tailored to a type of the information device or design an information device tailored to the wireless communication module, thus making it possible to provide a general-purpose wireless communication module independent from the device into which it is to be incorporated. In addition, impedance matching with the antenna can be immediately attained by reading out matching parameters according to the device-identifying information from the storage portion.

A fifth aspect of the present invention is a communication terminal, including: a transmitter, a transmission power being controlled by a base station; a variable impedance matching section arranged between an antenna and the transmitter, which adjusts an impedance by changing a matching parameter for the variable impedance matching section; a transmission power detector for detecting the transmission power; and a controller for adjusting the matching parameter based on the detected transmission power of the transmitter detected by the transmission power detector.

With this, impedance matching with the antenna can be easily attained in a communication terminal having a simplified configuration. Furthermore, in this instance, electric power supplied to the antenna is minimized, thereby achieving power conservation, and thus resulting in an extended life of the battery, which is advantageous.

Furthermore, according to a sixth aspect of the present invention, the controller may adjust the matching parameter when the transmission power of the transmitter detected by the transmission power detector is stable.

With this, it is possible to ensue that matching parameters with which impedance matching with the antenna can be attained are obtained.

According to a seventh aspect of the present invention, the communication terminal may further include an environment detector for detecting a predetermined external environment condition; and a storage portion for storing the matching parameter, and the controller may associate the matching parameter that has been used for the adjustment of the impedance with information on the environment detected by the environment detector and store the matching parameter and the information into the storage portion.

With this, it is possible to immediately attain impedance matching with the antenna by reading out from the storage portion matching parameters, according to the external environment conditions.

An eighth aspect of the present invention is an impedance matching method for a communications device including a transmitter, a transmission power being controlled by a base station; a variable impedance matching section arranged between the antenna and the transmitter, which adjusts an impedance by changing matching parameters; and a transmission power detector for detecting the transmission power, including: performing an impedance matching by adjusting a matching parameter for the variable impedance matching section based on a detected value of the transmission power of the transmitter detected by the transmission power detectord.

With this, by only detecting the transmission power of the transmitter, it is possible to attain impedance matching, thereby making it possible to achieve a minimal circuit construction without addition of special circuits.

In the present invention, impedance matching with an antenna can be easily attained when the wireless communication module incorporated into the information device. Furthermore, in the communication terminal, impedance matching with the antenna can be easily attained, thereby minimizing electric power supplied to the antenna.

DETAILED DESCRIPTION OF THE INVENTION

Thereinafter, a description is given of the best mode for carrying out the present invention with reference to the drawings.

First Embodiment

Figure 1:
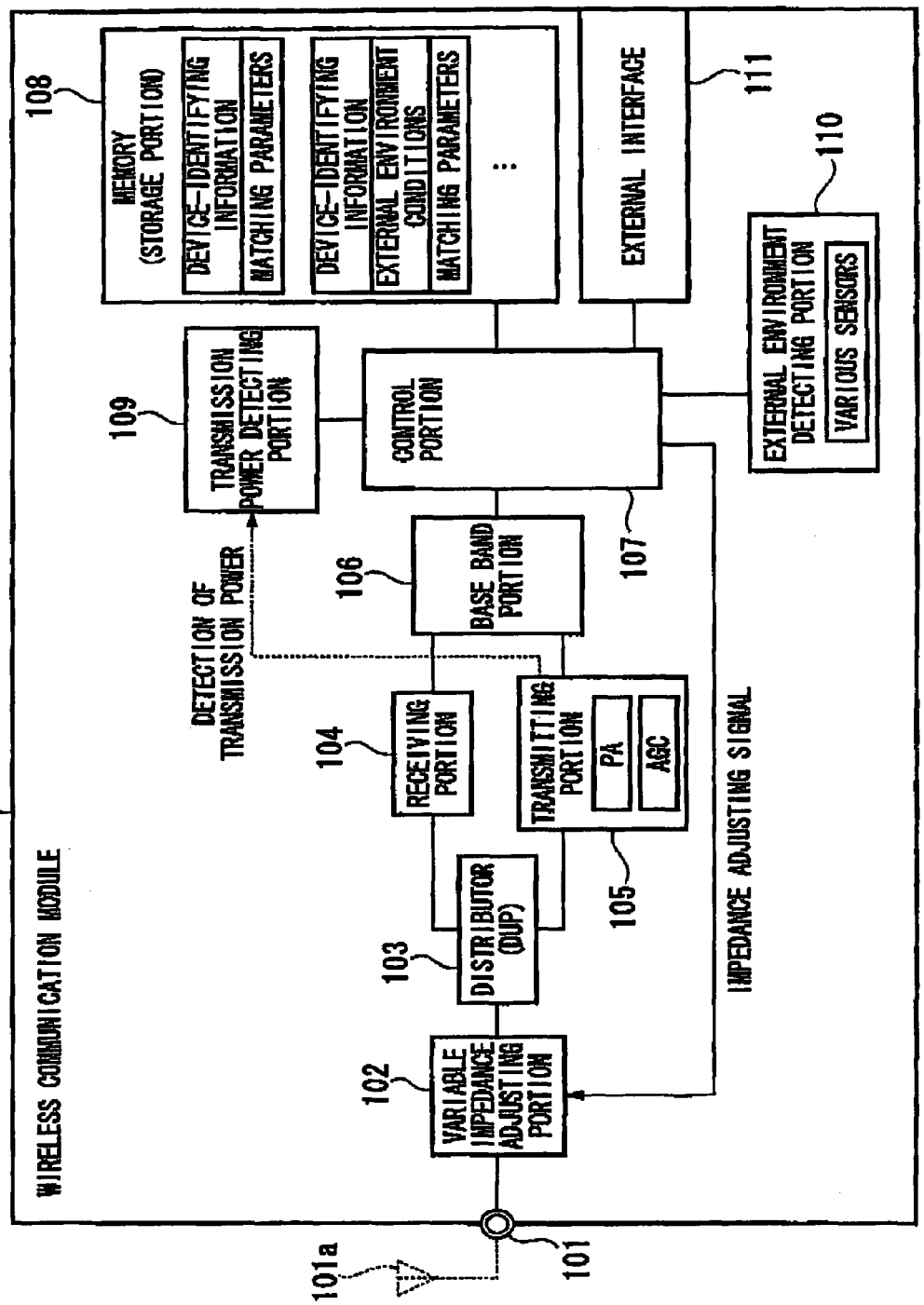
FIG. 1 is a schematic block diagram showing a wireless communication module according to a first embodiment of the present invention.

FIG. 1 is a schematic block diagram showing a wireless communication module having an external antenna according to a first embodiment of the present invention, in which transmission power of a wireless communication module 100 is controlled by a base station (not shown) so that the transmission power from the wireless communication module 100 can be received at an appropriate level by the base station.

In FIG. 1, the wireless communication module 100 includes an antenna connection portion (antenna connector) 101, a variable impedance matching portion (variable impedance matching section) 102 having variable impedance (for example, condenser capacity and inductance) which can be adjusted, a distributor (DUP) 103 for distributing signals transmitted or received, a receiving portion (receiver) 104, a transmitting portion (transmitter) 105, a base band portion 106 for controlling communications, a control portion (controller) 107, a memory 108, a transmission power detecting portion (transmission power detector) 109 for detecting the transmission power of the transmitting portion, an external environment detecting portion (environment detector) 110 for detecting external environment conditions when the portable mobile phone is in use, and an external interface 111 for interfacing with the information device having the wireless communication module incorporated therein.

The transmission power detecting portion 109 is configured so as to detect the transmission power of the transmitting portion 105. Furthermore, the transmission power detecting portion 109 is configured so as to detect, as indicators of the transmission power, an applied voltage of a power amplifier (PA) inside the transmitting portion 105 and an applied voltage of an automatic gain control circuit (AGC) from the base band portion 106.

The external environment detecting portion 110 is configured so as to detect a how the information device having the wireless communication module 100 incorporated therein is being used (for example, a user is making a phone call with a called party by putting the portable communication terminal to an ear by hand or data communications is carried out with the terminal placed on a desk) by using, for example, various sensors.

When the wireless communication module 100 is incorporated into an information device (for example, a PDA) having an antenna, an antenna 101a is connected to the antenna connection portion 101 and the control portion 107 executes the impedance matching procedure as described below.

Figure 2:
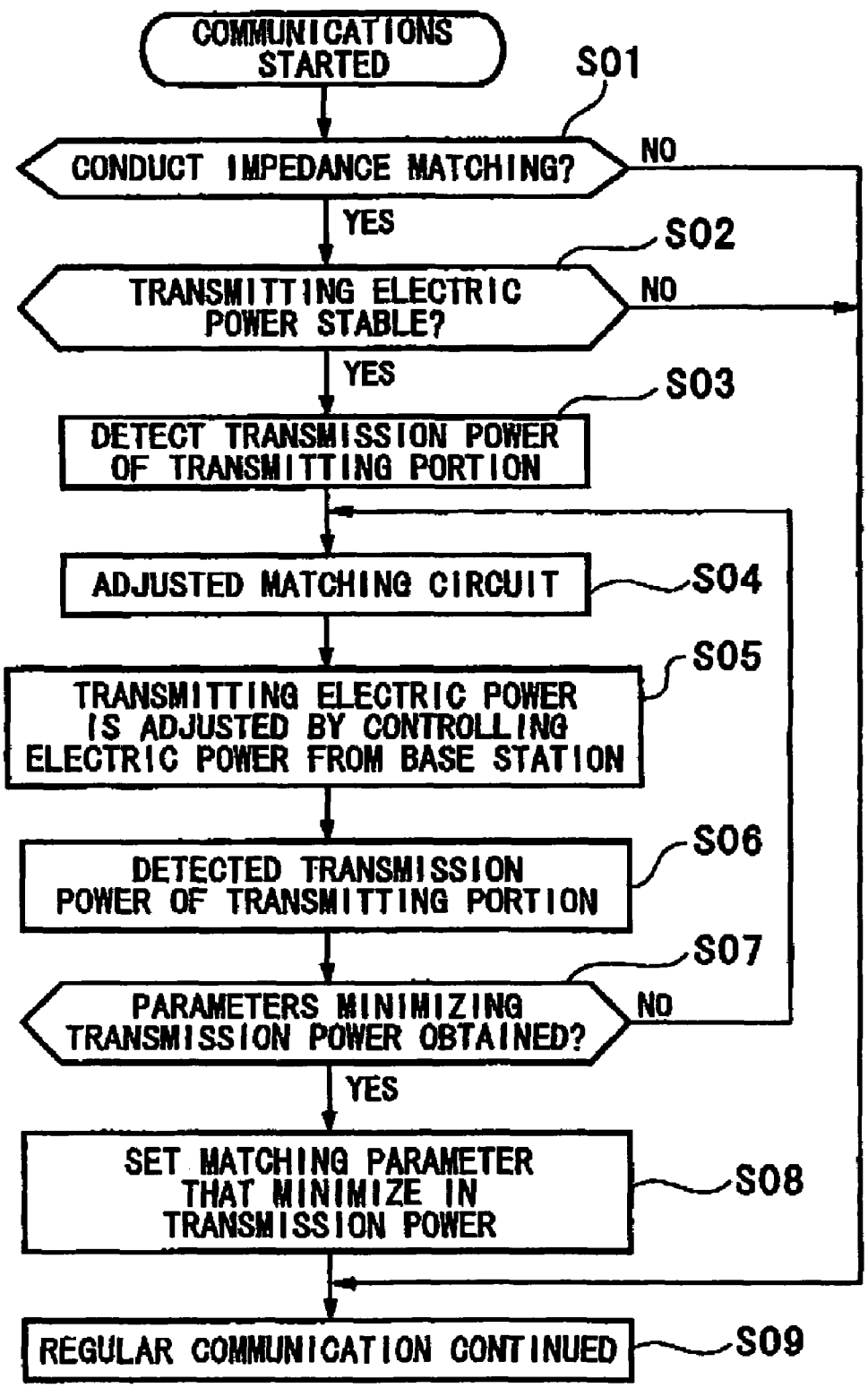
FIG. 2 is a flowchart showing an impedance matching procedure with the antenna and the transmitting portion.

FIG. 2 is a flowchart showing an impedance matching procedure of the antenna with the transmitting portion. Hereinafter, a description is given for the procedures for adjusting impedance matching in the wireless communication module shown in FIG. 1 with reference to the flowchart of FIG. 2.

First, when the wireless communication module 100 starts to communicate with the base station, the control portion 107 determines whether or not impedance matching should be executed (step S01). In this instance, such determination may be made by a user according to the conditions set by the user, or made as a process of prior adjustment in a manufacturing facility by a manufacturer rather than by a user.

When it is determined that matching should be executed in step S01, the control portion 107 then determines whether or not the transmission power detected by the transmission power detecting portion 109 is stable (step S02). The control portion 107 obtains the transmission power from the base band portion 106 and confirms that the transmission power detected by the transmission power detecting portion 109 has not been changed.

When it is determined that no matching should be executed in step S01 or the transmission power is unstable in step S02, the process does not proceed to the subsequent step S02 or S03, instead communications are executed as normal operation (step S09).

When it is determined that the transmission power is stable in step S02, the control portion 107 detects the transmission power of the transmitting portion 105 (step S03). Then, the control portion 107 controls the variable impedance matching portion 102 to change the impedance of the variable impedance matching portion 102 (step S04). In this instance, matching parameters should be stored into the memory (storage portion) 108.

As matching changes in the variable impedance matching portion 102, transmission power of the antenna 101a is changed. The change in matching to an improved match results in a better transmission efficiency from the transmitting portion 105 to the antenna 101a to suppress a reflected wave, thereby increasing the transmission power of the antenna 101a. The change in matching to a worsened match results in a reduction in the transmission power.

According to the change in the transmission power, the base station controls the transmission power of the wireless communication module 100 (step S05). When the transmission power is increased due to an improved match, the power is controlled so as to be decreased to compensate for the increase. When the transmission power is decreased, the transmission power is controlled so as to be increased to compensate for the decrease. This step either increases or decreases the transmission power of the transmitting portion 105. The transmission power detecting portion 109 again measures the transmission power of the transmitting portion 105 (S06).

Then, the steps S04 to S06 are executed to make a determination on whether or not matching parameters have been obtained which minimize the transmission power of the transmitting portion 105 (step S07). When the determination in step S07 is NO, the process returns to step S04 to make readjustment. This process is repeated until the determination in step S07 is YES. In the course of the iteration, matching parameters for the variable impedance matching portion 102 are adjusted and the transmission power of the transmitting portion 105 is measured, during which the control portion 107 determines matching parameters for the variable impedance matching portion 102 which minimize the transmission power of the transmitting portion 105.

Here, a description is given for determining a minimum value of the transmission power by changing matching parameters. In this instance, a matching parameter for the variable impedance matching portion 102 is given as x and a transmission power of the transmitting portion 105 is given as y. When x is an optimal value, y is minimized. When these optimal values are given as $x_0$ and $y_0$, y is greater than $y_0$ regardless of whether x becomes greater or smaller than $x_0$, and y is greater in value as the difference between x and $x_0$ is greater.

Figure 3:
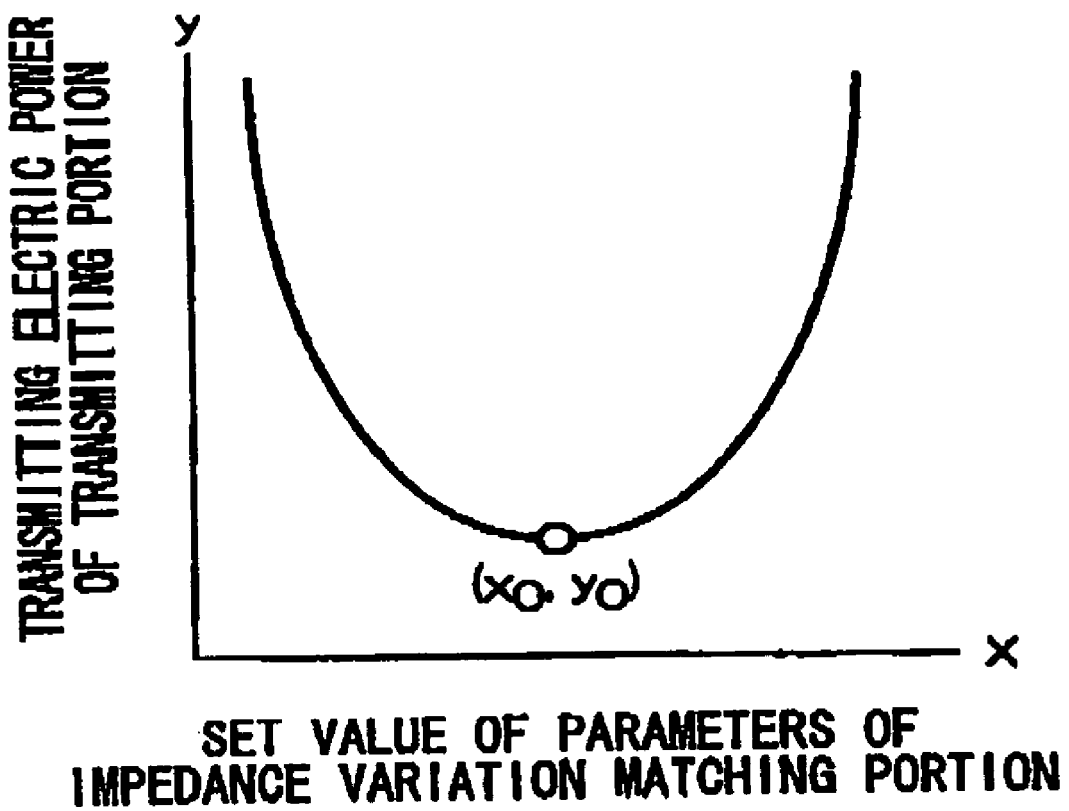
FIG. 3 is a graph showing a relationship between set values of matching parameters and the transmission power of the transmitting portion.

Therefore, ideally, it is considered that that y may be a quadratic function of x in the vicinity of $x_0$ as shown in FIG. 3. At this time, matching parameters may be changed N times at random in the range set by appropriate values, y obtained each time is stored into the memory 108 together with x, and the value of x which gives a minimum value of y at the time of completion of N iterations may be used. Alternatively, y may be measured at two appropriate points for x to calculate the slope therebetween until the slope becomes zero, and when the slope is zero, a median point may be obtained for these two points of x to give a minimum value. Alternatively, the slope may be calculated at x and x+Δx, and if the slope is a positive value, x may be deceased, whereas if the slope is a negative value, x may be increased. Then, measurement of the slope of x and x+Δx is done again, and this process is repeated to determine the x when the slope becomes zero.

Furthermore, it may be possible that when a settable minimum value of a matching parameter x is given as $x_{min}$ and a settable maximum value is given as $x_{max}$, x be allowed to change with an adjustable minimum increment or decrement from $x_{min}$ to $x_{max}$, and x at the time when a minimum value of the transmission power y is obtained in each step is given as a matching parameter $x_0$ for which the transmission power is minimized. In this method, since the detection time of the transmission power y is dependant on an adjustable minimum increment or decrement of x and an adjustable range of x, it is ensured that a matching parameter $x_0$ can be determined in the settable range of x, although it may require some time to determine the matching parameter $x_0$.

When in step S07 a minimum value of the transmission power of the transmitting portion 105 is determined and the determination is YES, a matching parameter at the time when a minimum value of the transmission power is obtained is set for the variable impedance matching portion 102 (step S08). When the setting is completed, adjustment of the variable impedance matching portion 102 is completed to continue ordinary communications (step S09).

The above-described an impedance matching procedure is executed by the control portion 107, impedance of the variable impedance matching portion 102 is adjusted so as to minimize the transmission power of the transmitting portion 105, and addition of circuits is minimized in an existing system for conducting an impedance matching, thereby making it possible to easily attain impedance matching with an antenna. Therefore, a wireless communication module can be designed without dependence on the type of information device having the wireless communication module incorporated therein and also impedance matching can be attained by a general-purpose wireless communication module independent of type of the information device having the module incorporated therein. Furthermore, in this instance, electric power supplied to the antenna is minimized, thereby achieving power consumption.

Figure 4:
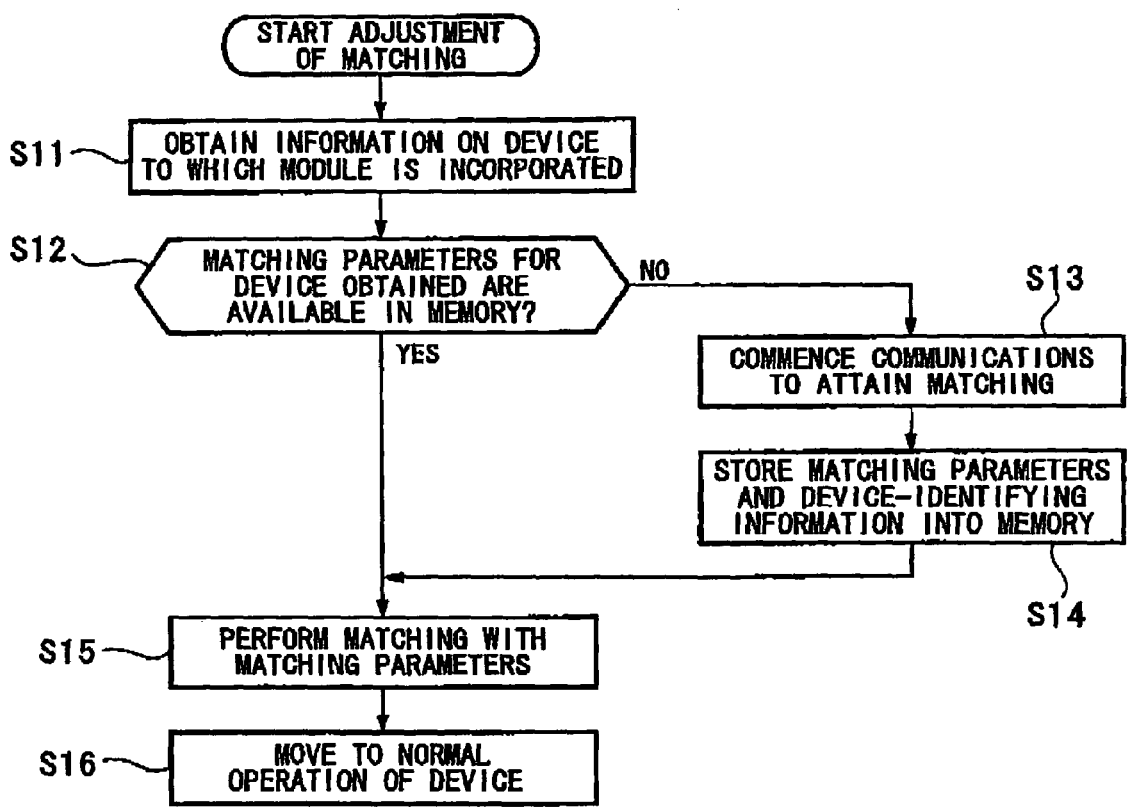
FIG. 4 is a flowchart showing the impedance matching procedure when the module is incorporated into the information device.

Next, a description is given for the impedance matching procedure when a wireless communication module is incorporated into an information device, such as a PDA, with reference to FIG. 4. FIG. 4 is a flowchart showing the impedance matching procedure when the wireless communication module is incorporated into an information device, such as a PDA. Furthermore, a description is given on the assumption that the information device having the module incorporated therein is a PDA.

The wireless communication module 100 (refer to FIG. 1) is incorporated into the PDA, and an antenna which is installed in the PDA is connected to an antenna connection portion 101. The PDA is connected to a control line which controls the wireless communication module 100 and an external interface 111 having a line. When the control portion 107 starts to adjust impedance matching, device-identifying information for the PDA (a serial number and the like) is obtained through the external interface 111 as a first step (step S11).

Then, the control portion 107 checks whether or not matching parameters for the thus identified PDA are stored into the memory 108 (step S12). If the matching parameters of the PDA are stored into the memory 108, the control portion 107 applies the matching parameters (step S15).

If the matching parameter is not in the memory 108, the control portion 107 conducts impedance matching by the impedance matching procedure described in the flowchart of FIG. 2 (step S13). Then, the control portion 107 stores matching parameters together with the PDA information (device-identifying information) into the memory 108 (step S14). Then, the control portion 107 applies the matching parameter to the variable impedance matching portion 102 (step S15) to complete adjustment of the matching and returns to normal operation of the information device (step S16).

It may also be possible that the control portion 107 detect external environment conditions using the external environment detecting portion 110 and make adjustments, such as impedance matching, according to the external environment conditions. In this instance, the device-identifying information, external environment conditions, and matching parameters are associated to each other and stored into the memory 108, by which matching parameters according to external environment conditions can be retrieved from the memory 108 to attain impedance matching immediately.

As described above, use of the wireless communication module in the present invention eliminates the necessity for designing a wireless communication module tailored to an information device or designing an information device tailored to the wireless communication module, thereby making it possible to provide a general-purpose wireless communication module independent of the type of information device having the module incorporated therein.

An explanation was given for the wireless communication module shown in FIG. 1 with reference to an example which is incorporated into a PDA. However, the information device having the wireless communication module incorporated therein may be any information device, including PDAs.

In addition, impedance matching with an antenna depends to some extent on conditions (external environment conditions) in which an information device and the like to which a wireless communication module is incorporated are used. Therefore, matching may be attained at any time when a user starts to make communications, or matching parameters may be stored into the memory 108, together with conditions for starting impedance matching to allow setting of corresponding matching parameters when can conditions are detected.

Second Embodiment

Figure 5:
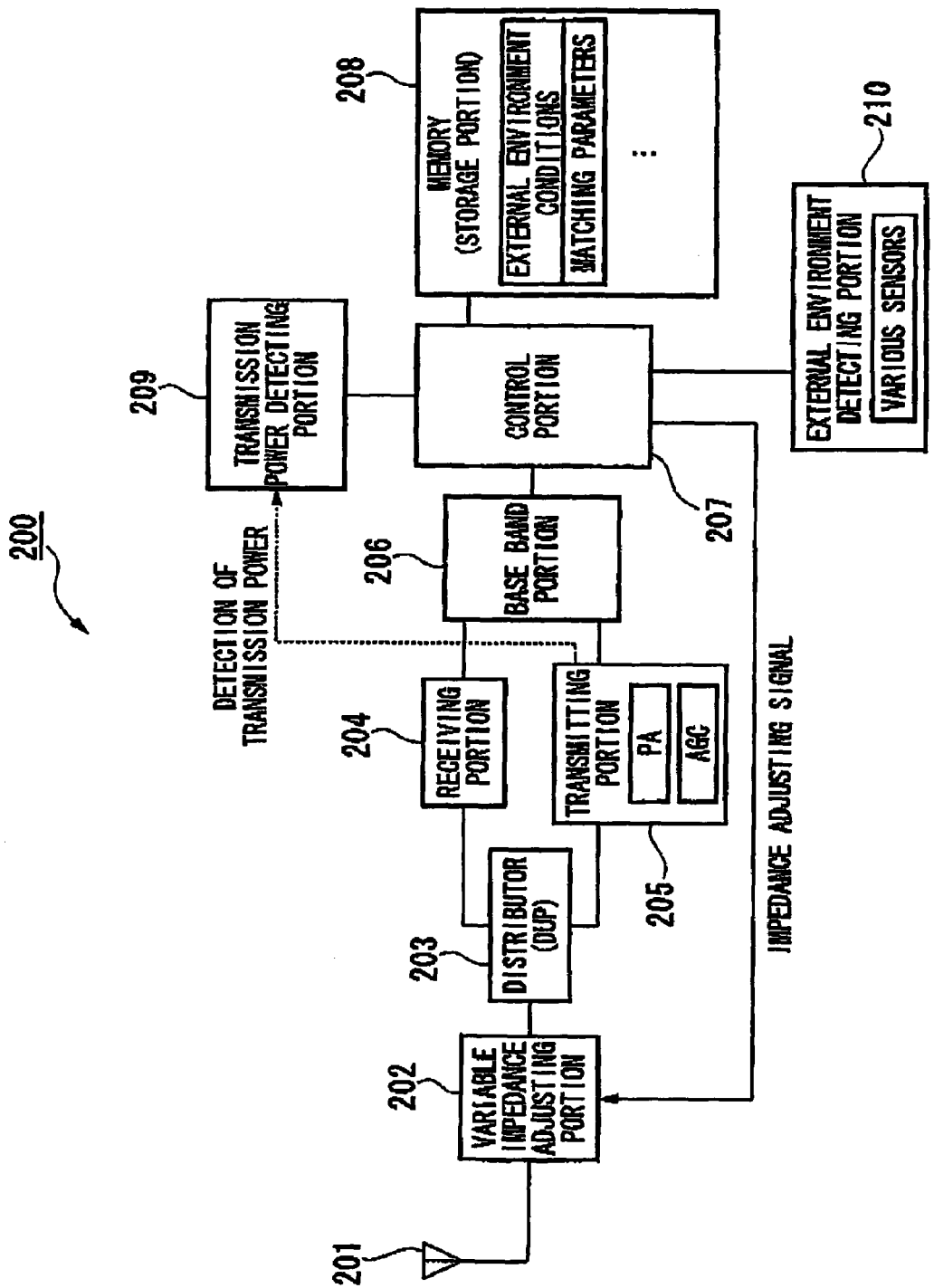
FIG. 5 is a schematic block diagram showing a wireless communication module according to a second embodiment of the present invention.

FIG. 5 is a schematic block diagram showing a communication terminal of a second embodiment in the present invention, showing a portable mobile phone as an example of the communication terminal. In the example shown in FIG. 5, the transmission power of a portable mobile phone 200 is controlled by a base station in such a way that the transmission power from the portable mobile phone 200 can be received at an appropriate level by the base station (not shown).

The portable mobile phone 200 includes an antenna 201, a variable impedance matching portion 202 having variable impedance which can be adjusted, a distributor (DUP) 203 for distributing signals transmitted or received, a receiving portion 204, a transmitting portion 205, a base band portion 206 for controlling communications, a control portion 207, a memory 208, a transmission power detecting portion 209 for detecting the transmission power of the transmitting portion 205, and an external environment detecting portion 210 for detecting external environment conditions when the portable mobile phone is in use.

Since the transmission power detecting portion 209 and the external environment detecting portion 110 in the present embodiment are constructed similarly to in the above first embodiment, detailed description thereof is omitted.

An impedance matching procedure of the antenna 201 with the transmitting portion 202 in the portable mobile phone 200 is the same as those explained in the flowchart of FIG. 2 in the first embodiment, by which impedance matching of the antenna 201 with the transmitting portion 205 can be easily attained in the portable mobile phone 200. Furthermore, in this instance, electric power supplied to the antenna 201 is minimized achieving power conservation, resulting in an extended lift of the battery, which is advantageous.

In addition, impedance matching with an antenna 201 depends to some extent on circumstances in which a communication terminal such as a portable mobile phone is used. Therefore, matching may be attained at any time when a user starts to make communications, or matching parameter may be stored into the memory 208, together with conditions for starting impedance matching, to allow setting of corresponding matching parameters when certain conditions are detected.

There is, for example, a device for detecting conditions such as environment conditions, of a user making a phone call by putting the mobile phone to an ear by hand, making data communications with the communication terminal placed on a desk, or making communications by using a hand-free kit, with the terminal placed on a desk, and matching parameter under these environmental conditions are stored into the memory together with the environmental conditions and the parameters are retrieved and set when the environmental conditions are detected thereafter.

Figure 6:
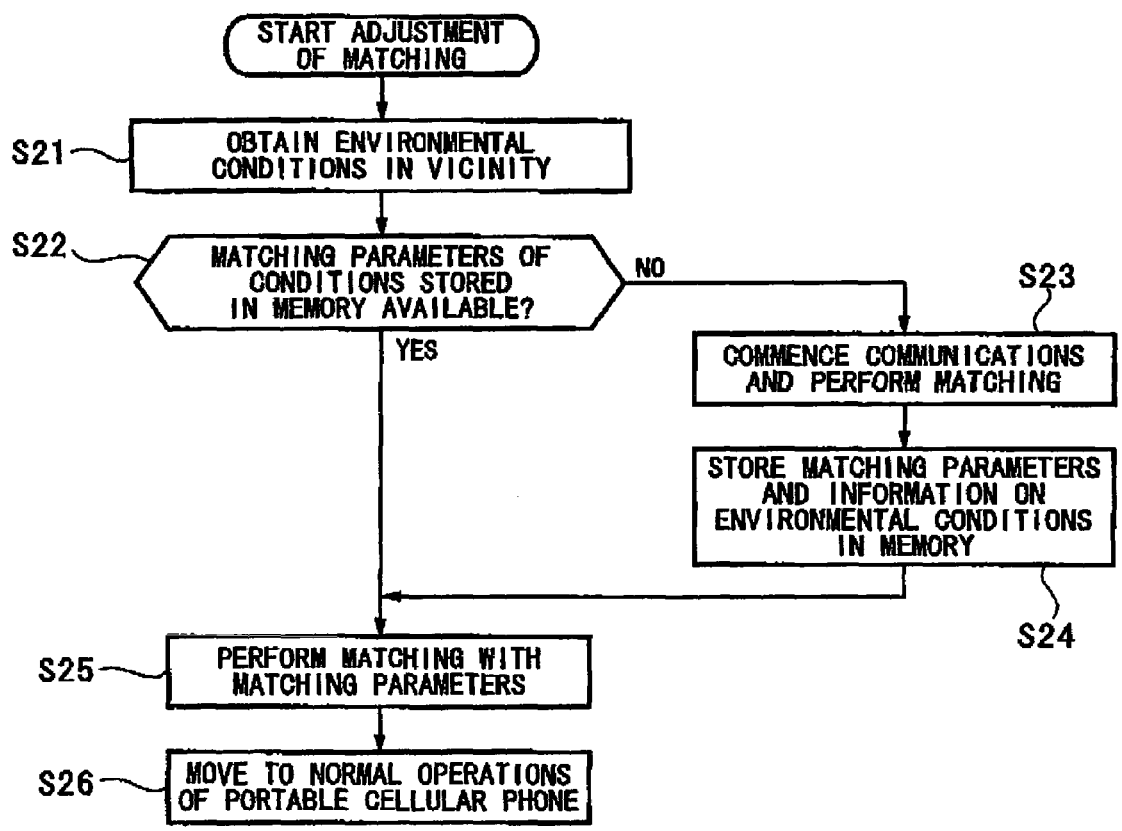
FIG. 6 is a flowchart showing the impedance matching procedure according to external environment conditions.

A description is given for the impedance matching procedure according to the external environments with reference to the flow shown in FIG. 6.

In starting adjustment of the impedance matching, the control portion 207 detects environmental conditions in the surroundings from the external environment detecting portion 210 as a first sp (step S21). In this instance, the device for detecting the conditions includes a device for detection by using various sensors, with terminal kept in hand, put to an ear, or placed on a desk. Alternatively, matching parameters may be set to a certain value to identify a matching pattern in a specific environment in accordance with a change in the signal receiving level of an antenna.

Once environmental conditions are obtained in step S21, the control portion 207 detects the conditions obtained in step S21 and checks whether or not matching parameters at that time are available in the memory 208 in step S22.

If matching parameter corresponding to the conditions are available, the matching parameters are applied to the variable impedance matching portion 202 to attain a matching (step S25).

If no matching parameters corresponding to the conditions are available, the control portion 207 starts to make communications and adjusts matching by the impedance matching procedure explained in the flowchart of FIG. 2 in the first embodiment, thereby determining the matching parameters (step S23).

Then, the control portion 207 stores the environmental conditions and the matching parameters into the memory 208 (step S24). Thereafter, the matching parameters are applied (step S25) to complete adjustment of the matching. Then, the portable mobile phone 200 returns to normal operation (step S26).

The matching parameters in the memory 208 are stored previously for specific environmental conditions, thereby making it possible to retrieve the corresponding matching parameters to attain instant matching in the next step.

In the above second embodiment, an explanation was given for a portable mobile phone as a communication terminal, and communication terminals include mobile terminals, PDAs (Personal Digital Assistances) and the like.

As described above, a method for attaining impedance matching so as to minimize transmission power is preferably applicable to a communication system in which transmission power of a communication terminal (or a wireless communication module) in communications is controlled by a base station (for example, in a Cdma 2000 1x, or Cdma 2000 1xEV-DO, a base station dictates the transmission power of a communication terminal an electric control bit every 1/800 or 1/600 seconds, respectively, so as to keep an electric power level of the communication terminal received at the base station at a specific level). In this instance, in a stable environment, a transmission power of the antenna end of the communication terminal is kept substantially constant by controlling the transmission power by the base station. Therefore, the transmission power of the transmitting portion and voltage of a PA or an AGC are measured at this time to provide impedance matching that achieves a minimum transmission power, thereby making it possible in order to attain a matching with an antenna in a simplified configuration. Furthermore, in this instance electric power supplied to the antenna is minimized, achieving power conservation and results in an extended life of the battery, which is advantageous.

With this construction, it may be suffice to detect a transmission power of the transmitting portion (for example, voltage applied to a PA and/or an AGC), and a Cdma 2000 1x or the like permits detection of settings of the transmission power or voltage of a base band portion without addition of special circuits. This eliminates the necessity for an additional transmission power detecting circuit, requiring only addition of a variable matching circuit and the control thereof, thereby making it possible to attain impedance matching within a minimum addition of circuits. Furthermore, if the wireless communication module of the present invention is incorporated, development tasks required in the conventional art, such as the necessity for attaining matching after incorporating a wireless communication module, can be eliminated, a more general-purpose module can be provided, and also man-power required for development of each information device having the wireless communication module incorporated therein can be reduced.

Furthermore, the preset invention can be embodied without any addition of an exchange of specific information, such as notification of information on a received signal strength indicator (RSSI) at a base station to an ex system, such as a Cdma 2000 1x, for example, or without any alteration to such systems.

In the present invention, when a wireless communication module is incorporated into an information device (for example, a PDA), impedance matching with an antenna can be easily attained when the wireless communication module incorporated into the information device. Furthermore, in a communication terminal, impedance matching with an antenna can be easily attained and electric power input supplied to the antenna is minimized to effectively save electric power, resulting in an extended life of the battery. Thus, the present invention is advantageously applied in order to provide a wireless communication module, a communication terminal, and an impedance matching method.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication module for engaging in communications with a base station, the wireless communication module being incorporated into an information device having an antenna, including:
    a transmitter, a transmission power being controlled by the base station;
    a variable impedance matching section arranged between an antenna connector connected to the antenna and the transmitter, which adjusts an impedance by changing a matching parameter for the variable impedance matching section;
    a transmission power detector for detecting the transmission power; and
    a controller for adjusting the matching parameter based on the detected transmission power of the transmitter detected by the transmission power detector.

2. The wireless communication module according to claim 1, wherein the controller adjusts the matching parameter when the transmission power of the transmitter detected by the transmission power detector is stable.

3. The wireless communication module according to claim 1, further including:
    an environment detector for detecting a predetermined external environment condition; and
    a storage section for storing the matching parameter, wherein the controller associates the matching parameter that has been used for the adjustment of the impedance with information on the environment detected by the environment detector and stores the matching parameter and the information into the storage section.

4. The wireless communication module according to claim 1, further including:

a storage section for storing the matching parameter, wherein the controller obtains device-identifying information from the information device and associates the matching parameter that has been used for the adjustment of the impedance with the device-identifying information and stores the matching parameter and the device-identifying information in the storage section.

5. A communication terminal, including:

a transmit a transmission power of the transmitter being controlled by a base station;

a variable impedance matching section arranged between an antenna and the transmitter, which adjusts an impedance by changing a matching parameter for the variable impedance matching section;

a transmission power detector for detecting the transmission power; and a controller for adjusting the matching parameter based on the detected transmission power of the transmitter detected by the transmission power detector.

6. The communication terminal according to claim 5, wherein the controller adjusts the matching parameter when the transmission power of the transmitter detected by the transmission power detector is stable.

7. The communication terminal according to claim 5, further including:

an environment detector for detecting a predetermined external environment condition; and a storage section for storing the matching parameter, wherein the controller associates the matching parameter that has been used for the adjustment of the impedance with information on the environment detected by the environment detector and stores the matching parameter and the information into the storage section.

8. An impedance matching method for a communications device including a transmitter, a transmission power of the transmitter being controlled by a base station; a variable impedance matching section arranged between the antenna and the transmitter, which adjusts an impedance by changing matching parameters; and a transmission power detector for detecting the transmission power, including:

performing an impedance matching by adjusting a matching parameter for the variable impedance matching section basd on a detected value of the transmission power of the transmitter detected by the transmission power detector.

* * * * *